United States Patent
Leeman et al.

(10) Patent No.: US 10,545,010 B1
(45) Date of Patent: Jan. 28, 2020

(54) BLAST MAT CONFIGURATION

(71) Applicant: Oshkosh Defense, LLC, Oshkosh, WI (US)

(72) Inventors: Jake Leeman, Oshkosh, WI (US); Jennifer King, Oshkosh, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 125 days.

(21) Appl. No.: 15/957,198

(22) Filed: Apr. 19, 2018

Related U.S. Application Data

(60) Provisional application No. 62/491,429, filed on Apr. 28, 2017.

(51) Int. Cl.
*F41H 7/04* (2006.01)
*B62D 25/20* (2006.01)
*B60N 3/04* (2006.01)

(52) U.S. Cl.
CPC .............. *F41H 7/042* (2013.01); *B60N 3/048* (2013.01); *B62D 25/2072* (2013.01)

(58) Field of Classification Search
CPC .......... B60N 3/04; B60N 3/044; B60N 3/048; B62D 25/2072; F41H 7/072; F41H 7/042
USPC ...... 296/39.1, 97.23, 187.07, 187.08, 190.03
See application file for complete search history.

(56) References Cited

U.S. PATENT DOCUMENTS

| | | | |
|---|---|---|---|
| 5,517,894 A * | 5/1996 | Bohne | F41H 5/0457 296/39.1 |
| 5,663,520 A * | 9/1997 | Ladika | F41H 5/226 296/187.07 |
| 5,697,741 A | 12/1997 | Harris et al. | |
| 5,779,300 A | 4/1998 | McNeilus et al. | |
| 5,829,946 A | 11/1998 | McNeilus et al. | |
| 5,931,628 A | 8/1999 | Christenson | |
| 6,290,450 B1 | 9/2001 | Humphries et al. | |
| 6,485,079 B1 | 11/2002 | Brown et al. | |
| 6,527,495 B2 | 3/2003 | Humphries et al. | |
| 6,666,491 B2 | 12/2003 | Schrafel | |
| 6,918,721 B2 | 7/2005 | Venton-Walters et al. | |
| 6,997,506 B2 | 2/2006 | Hecker | |
| 7,055,880 B2 | 6/2006 | Archer | |
| 7,073,847 B2 | 7/2006 | Morrow et al. | |
| 7,118,314 B2 | 10/2006 | Zhou et al. | |
| 7,264,305 B2 | 9/2007 | Kuriakose | |
| 7,370,904 B2 | 5/2008 | Wood, Jr. et al. | |
| 7,517,005 B2 | 4/2009 | Kuriakose | |
| 7,621,580 B2 | 11/2009 | Randjelovic et al. | |

(Continued)

*Primary Examiner* — Jason S Daniels
(74) *Attorney, Agent, or Firm* — Foley & Lardner LLP

(57) ABSTRACT

A vehicle includes a frame, multiple tractive assemblies engaging the frame, a cabin coupled to the frame, and a blast mat. The cabin includes a seat configured to support an occupant and multiple walls at least partially defining a footwell configured to receive the feet of the occupant when the occupant is seated in the seat. The blast mat is positioned within the footwell and configured to absorb energy from an explosion, thereby reducing energy transferred into the feet of the occupant due to the explosion. The blast mat has a top surface and a bottom surface. At least a portion of the bottom surface of the blast mat engages at least one of the walls. A thickness of the blast mat is defined between the top surface and the portion of the bottom surface engaging at least one of the walls. The thickness varies throughout the blast mat.

17 Claims, 9 Drawing Sheets

(56) References Cited

U.S. PATENT DOCUMENTS

| | | | |
|---|---|---|---|
| 7,823,948 B2 | 11/2010 | Redman et al. | |
| 7,954,882 B2 | 6/2011 | Brummel et al. | |
| 8,152,216 B2 | 4/2012 | Howell et al. | |
| 8,376,439 B2 | 2/2013 | Kuriakose et al. | |
| 8,656,822 B1 * | 2/2014 | Saucedo | F41H 7/042 89/36.01 |
| 8,794,886 B1 | 8/2014 | Nett et al. | |
| 8,967,699 B1 | 3/2015 | Richmond et al. | |
| 9,174,686 B1 | 11/2015 | Messina et al. | |
| 9,366,507 B1 | 6/2016 | Richmond et al. | |
| 9,493,093 B2 | 11/2016 | Stingle et al. | |
| 9,707,869 B1 | 7/2017 | Messina et al. | |
| 9,738,186 B2 | 8/2017 | Krueger et al. | |
| 2010/0251883 A1 * | 10/2010 | Naroditsky | B60N 2/4242 89/36.02 |

* cited by examiner

BLAST MAT CONFIGURATION

CROSS-REFERENCE TO RELATED PATENT APPLICATION

This application claims the benefit of U.S. Provisional Application No. 62/491,429, filed Apr. 28, 2017, which is incorporated herein by reference in its entirety.

BACKGROUND

Certain vehicles may have a limited ability to mitigate the effect of a blast event on an occupant without adversely affecting occupant comfort. Energy absorbing mats are used in vehicles to absorb a portion of the energy of an underbody blast event, reducing the energy that is transmitted into an occupant's foot and person. These mats may traditionally have a uniform thickness, creating an uneven surface along the floor of the vehicle.

SUMMARY

One exemplary embodiment relates to a vehicle including a frame, multiple tractive assemblies engaging the frame, a cabin coupled to the frame, and a blast mat. The cabin includes a seat configured to support an occupant and multiple walls at least partially defining a footwell configured to receive the feet of the occupant when the occupant is seated in the seat. The blast mat is positioned within the footwell and configured to absorb energy from an explosion, thereby reducing energy transferred into the feet of the occupant due to the explosion. The cabin defines a longitudinal axis extending parallel to a forward direction of travel of the vehicle and a lateral axis extending perpendicular to the longitudinal axis. The blast mat has a top surface and a bottom surface. At least a portion of the bottom surface of the blast mat engages at least one of the walls. A thickness of the blast mat is defined between the top surface and the portions of the bottom surface engaging at least one of the walls. The thickness varies throughout the blast mat.

Another exemplary embodiment relates to a vehicle including a frame, a plurality of tractive assemblies engaging the frame, a cabin coupled to the frame, a blast mat. The cabin includes a seat configured to support an occupant and a bottom wall at least partially defining a footwell configured to receive the feet of the occupant when the occupant is seated in the seat. The blast mat is positioned within the footwell and configured to absorb energy from an explosion originating below the cabin, thereby reducing a force imparted on the feet of the occupant due to the explosion. The blast mat has a top surface and a bottom surface. The cabin defines a longitudinal axis extending parallel to a forward direction of travel of the vehicle and a lateral axis extending perpendicular to the longitudinal axis. At least a portion of the bottom surface of the blast mat extends along the bottom wall of the cabin. The top surface of the blast mat is planar. The bottom surface of the blast mat is angled relative to the top surface of the blast mat such that the top surface is angled relative to the bottom wall.

Yet another exemplary embodiment relates to a blast mat having a top surface and a bottom surface. At least a portion of the bottom surface is configured to engage a support surface at least partially defining a footwell of a vehicle. The top surface is configured to support the feet of an occupant of the vehicle. The blast mat is configured to absorb energy from an explosion originating below the blast mat, thereby reducing a force imparted to the feet of the occupant by the explosion. A thickness of the blast mast is defined between the top surface and the portion of the bottom surface configured to engage the support surface. The thickness varies throughout the blast mat.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a vehicle includes various components that improve performance relative to traditional systems. The vehicle includes a front cabin having a seat for an occupant or passenger and a footwell configured to receive the feet and legs of the occupant. The bottom surface of the footwell is uneven (e.g., angled, etc.) relative to a horizontal reference plane. The vehicle further includes a blast mat disposed within the footwell and configured absorb blast energy from a blast event (e.g., an explosion originating under the front cabin, etc.). According to an exemplary embodiment, a bottom surface of the blast mat is angled relative to a top surface of the blast mat, such that the top surface of the blast mat is level (i.e., is parallel to a horizontal plane) when the bottom surface of the blast mat rests on the bottom surface of the footwell. Having a level top surface to support the feet of the occupant increases the comfort of the occupant relative to conventional blast mats having uneven top surfaces.

Figure 1:
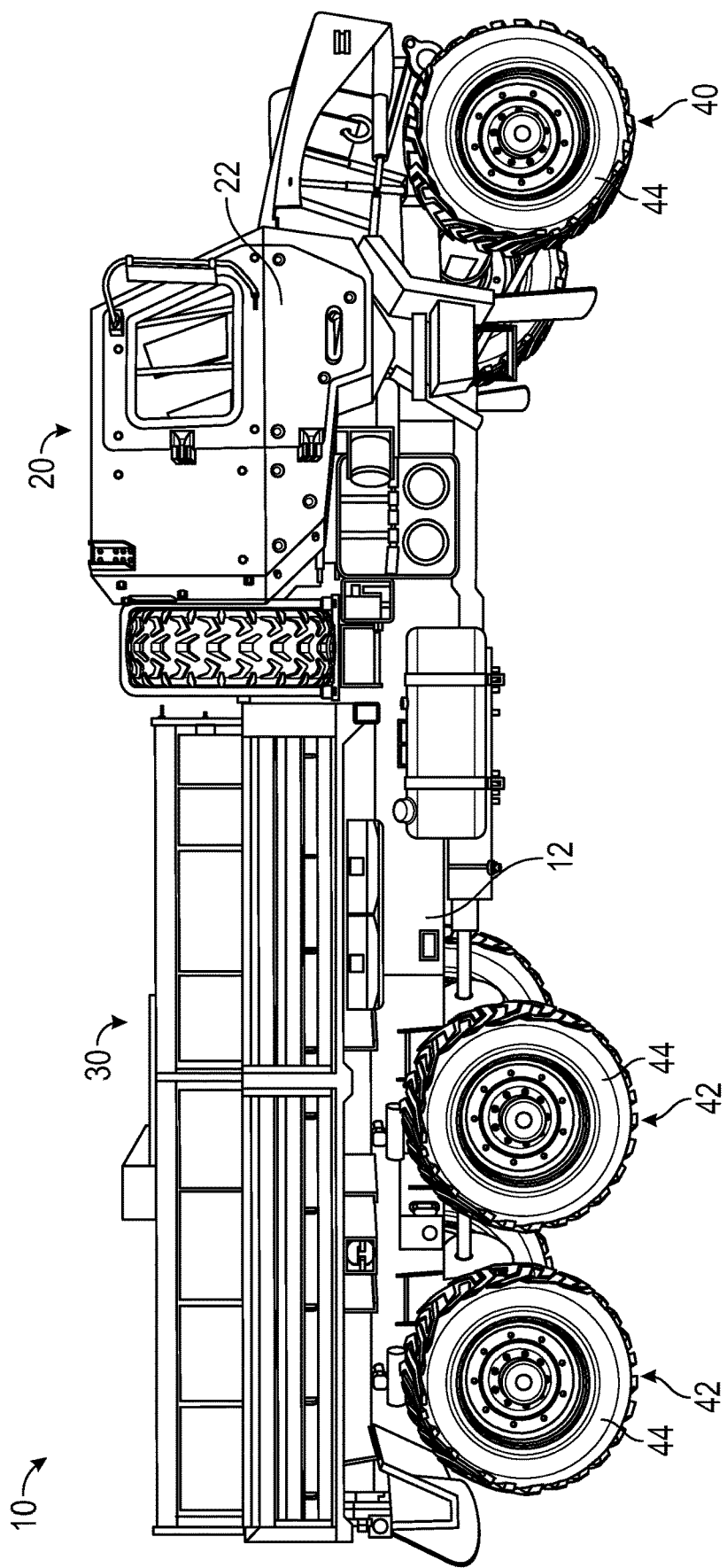
FIG. 1 is a side view of a vehicle, according to an exemplary embodiment.

According to the exemplary embodiment shown in FIG. 1, a vehicle, shown as vehicle 10, includes a chassis, shown as frame 12, that supports a body assembly including a first portion, shown as front cabin 20, and a second portion, shown as mission equipment 30. As shown in FIG. 1, the mission equipment 30 is disposed behind the front cabin 20.

The frame 12 of the vehicle 10 engages a plurality of tractive assemblies, shown as front tractive assemblies 40 and rear tractive assemblies 42. According to an exemplary embodiment, the vehicle 10 is a military ground vehicle. In other embodiments, the vehicle 10 is an off-road vehicle such as a utility task vehicle, a recreational off-highway vehicle, an all-terrain vehicle, a sport utility vehicle, and/or still another vehicle. In yet other embodiments, the vehicle 10 is another type of off-road vehicle such as mining, construction, and/or farming equipment. In still other embodiments, the vehicle 10 is an aerial truck, a rescue truck, an aircraft rescue and firefighting (ARFF) truck, a concrete mixer truck, a refuse truck, a commercial truck, a tanker, an ambulance, and/or still another vehicle.

According to an exemplary embodiment, the frame 12 defines a longitudinal axis. The longitudinal axis may be generally aligned with a frame rail of the frame 12 of the vehicle 10 (e.g., front-to-back, etc.). In some embodiments, the vehicle 10 includes a plurality of front tractive assemblies 40 and/or a plurality of rear tractive assemblies 42 (e.g., one, two, etc.). The front tractive assemblies 40 and/or the rear tractive assemblies 42 may include brakes (e.g., disc brakes, drum brakes, air brakes, etc.), gear reductions, steering components, wheel hubs, wheels, tires, and/or other features. As shown in FIG. 1, the front tractive assemblies 40 and the rear tractive assemblies 42 each include tractive elements, shown as wheel and tire assemblies 44. In other embodiments, at least one of the front tractive assemblies 40 and the rear tractive assemblies 42 include a different type of tractive element (e.g., a track, etc.).

According to an exemplary embodiment, the front cabin 20 includes one or more doors, shown as doors 22, that facilitate entering and exiting an interior of the front cabin 20. The interior of the front cabin 20 may include a plurality of seats (e.g., two, three, four, five, etc.), vehicle controls, driving components (e.g., steering wheel, accelerator pedal, brake pedal, etc.), etc. According to the exemplary embodiment shown in FIG. 1, the mission equipment 30 includes a cargo body configured to facilitate transporting various military equipment (e.g., medical supplies, ammunition, weapons, missiles, personnel, etc.). In other embodiments, the mission equipment 30 includes a truck bed or a flat bed. In some embodiments, the mission equipment 30 additionally or alternatively includes a boom lift. In another embodiment, the mission equipment 30 includes an at least partially enclosed troop transport cabin configured to facilitate transporting troops (e.g., eight, ten, twelve, twenty, etc.) with the vehicle 10.

According to an exemplary embodiment, the vehicle 10 includes a powertrain system. The powertrain system may include a primary driver (e.g., an engine, a motor, etc.), an energy generation device (e.g., a generator, etc.), and/or an energy storage device (e.g., a battery, capacitors, ultracapacitors, etc.) electrically coupled to the energy generation device. The primary driver may receive fuel (e.g., gasoline, diesel, etc.) from a fuel tank and combust the fuel to generate mechanical energy. A transmission may receive the mechanical energy and provide an output to the generator. The generator may be configured to convert mechanical energy into electrical energy that may be stored by the energy storage device. The energy storage device may provide electrical energy to a motive driver to drive at least one of the front tractive assemblies 40 and the rear tractive assemblies 42. In some embodiments, each of the front tractive assemblies 40 and/or the rear tractive assemblies 42 include an individual motive driver (e.g., a motor that is electrically coupled to the energy storage device, etc.) configured to facilitate independently driving each of the wheel and tire assemblies 44. In some embodiments, a transmission of the vehicle 10 is rotationally coupled to the primary driver, a transfer case assembly, and one or more drive shafts. The one or more drive shafts may be received by one or more differentials configured to convey the rotational energy of the drive shaft to a final drive (e.g., half-shafts coupled to the wheel and tire assemblies 44, etc.). The final drive may then propel or moves the vehicle 10. In such embodiments, the vehicle 10 may not include the generator and/or the energy storage device. The powertrain of the vehicle 10 may thereby be a hybrid powertrain or a non-hybrid powertrain. According to an exemplary embodiment, the primary driver is a compression-ignition internal combustion engine that utilizes diesel fuel. In alternative embodiments, the primary driver is another type of device (e.g., spark-ignition engine, fuel cell, electric motor, etc.) that is otherwise powered (e.g., with gasoline, compressed natural gas, hydrogen, electricity, etc.).

Figure 2:
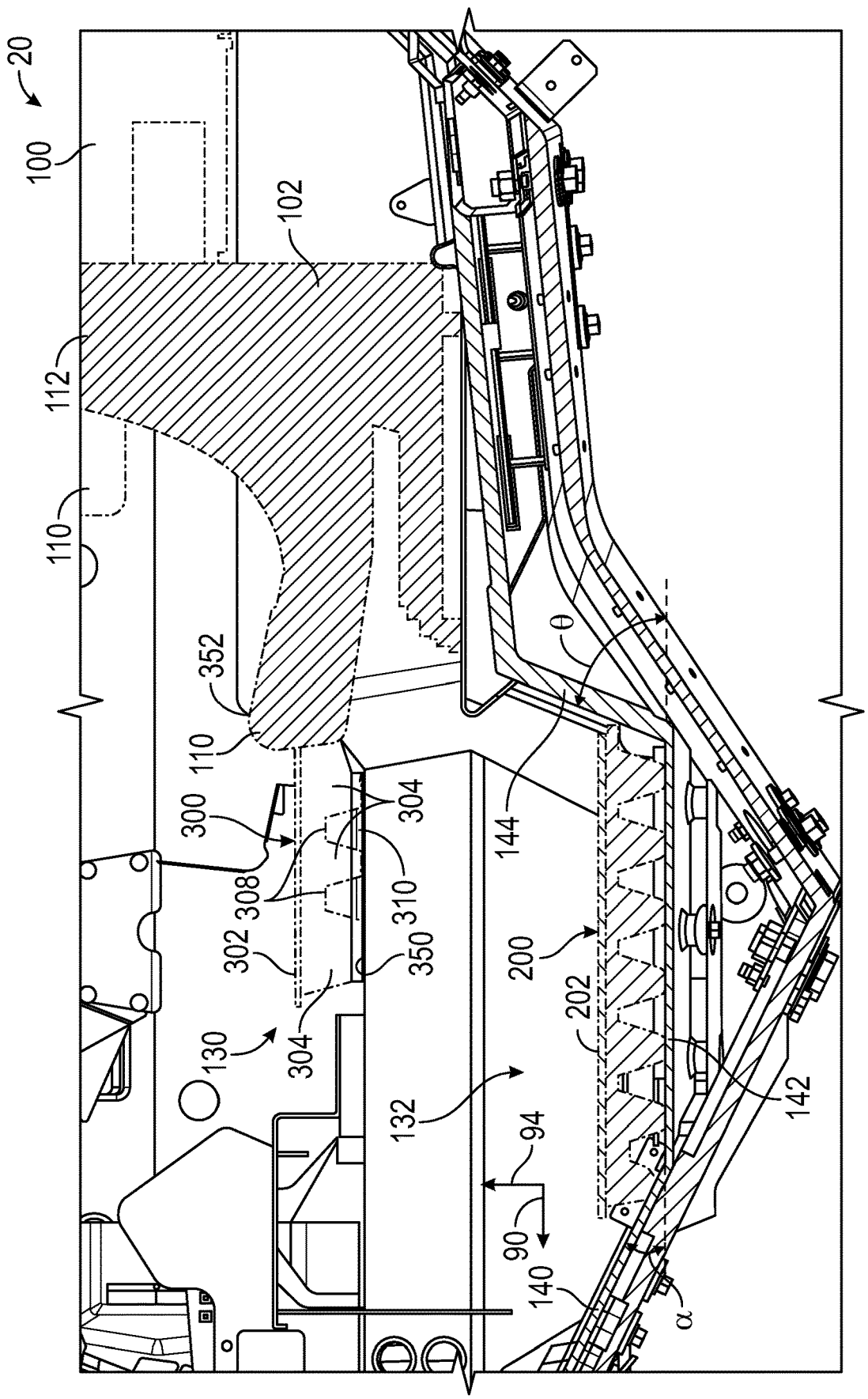
FIG. 2 is a section view of a front cabin of the vehicle of FIG. 1, according to an exemplary embodiment.
Figure 3:
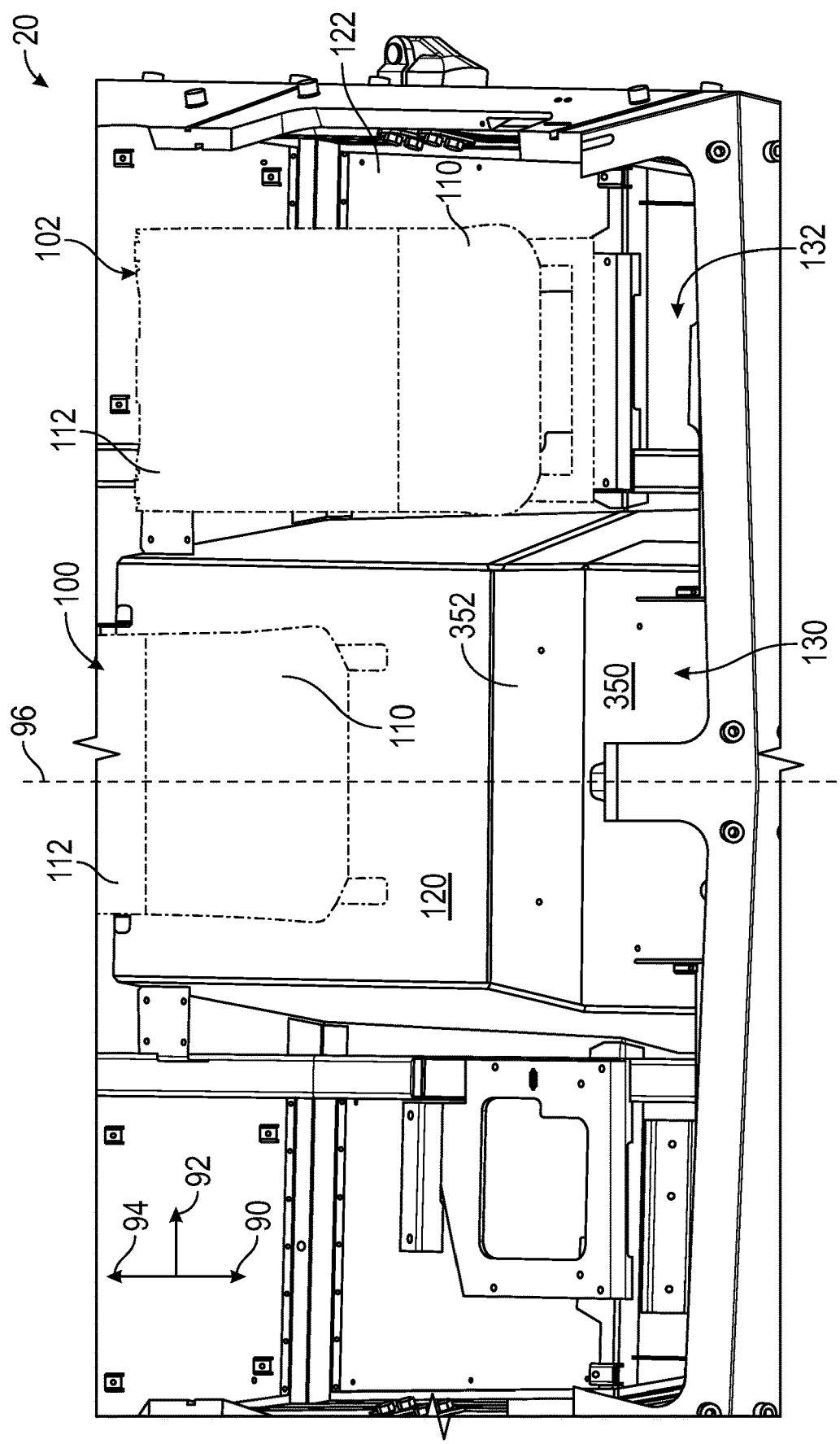
FIG. 3 is a perspective view of an interior of the front cabin of FIG. 2.

Referring to FIGS. 2 and 3, an interior of the front cabin 20 is shown. The front cabin 20 is configured to carry one or more occupants during normal operation of the vehicle 10. A number of axes are defined with respect to the front cabin 20. A longitudinal axis 90 is defined parallel to the direction of travel of the vehicle 10 and oriented toward the front of the front cabin 20. A lateral axis 92 is defined perpendicular to the longitudinal axis 90, is disposed entirely within a horizontal plane, and is pointed toward a left side of the front cabin 20. A vertical axis 94 is oriented perpendicular to both the longitudinal axis 90 and the lateral axis 92 and is oriented upwards towards a top of the front cabin 20. The locations of the longitudinal axis 90, the lateral axis 92, and the vertical axis 94 may be arbitrary. A center plane 96 is centered laterally across the front cabin 20. The center plane 96 extends parallel to and/or contains the longitudinal axis 90 and the lateral axis 92.

As shown in FIG. 3, the front cabin 20 includes a seat 100 and a seat 102 each configured to hold one occupant. In other embodiments, the front cabin 20 includes a single seat configured to hold multiple occupants (e.g., a bench style seat, etc.). Seat 100 and seat 102 each include a bottom 110 and a back 112 that support the bottom and the back of an occupant, respectively. The seat 100 and the seat 102 may be substantially similar in construction. The seat 100 is disposed along the center plane 96. The seat 102 is laterally offset from the seat 100. The seat 100 is coupled to a floor section 120. The seat 102 is coupled to a floor section 122. The floor section 122 is vertically offset from, and positioned lower than, the floor section 120 such that the seat 102 is positioned lower than the seat 100. The seat 102 may be longitudinally offset forward of the seat 100. Below and longitudinally forward of the seat 100, the front cabin 20 defines a center footwell 130. Below and longitudinally forward of the seat 102, the front cabin 20 defines a side footwell 132. The center footwell 130 and the side footwell 132 each provide a space for the feet and legs of the occupants sitting in the seat 100 and the seat 102, respectively.

Figure 4:
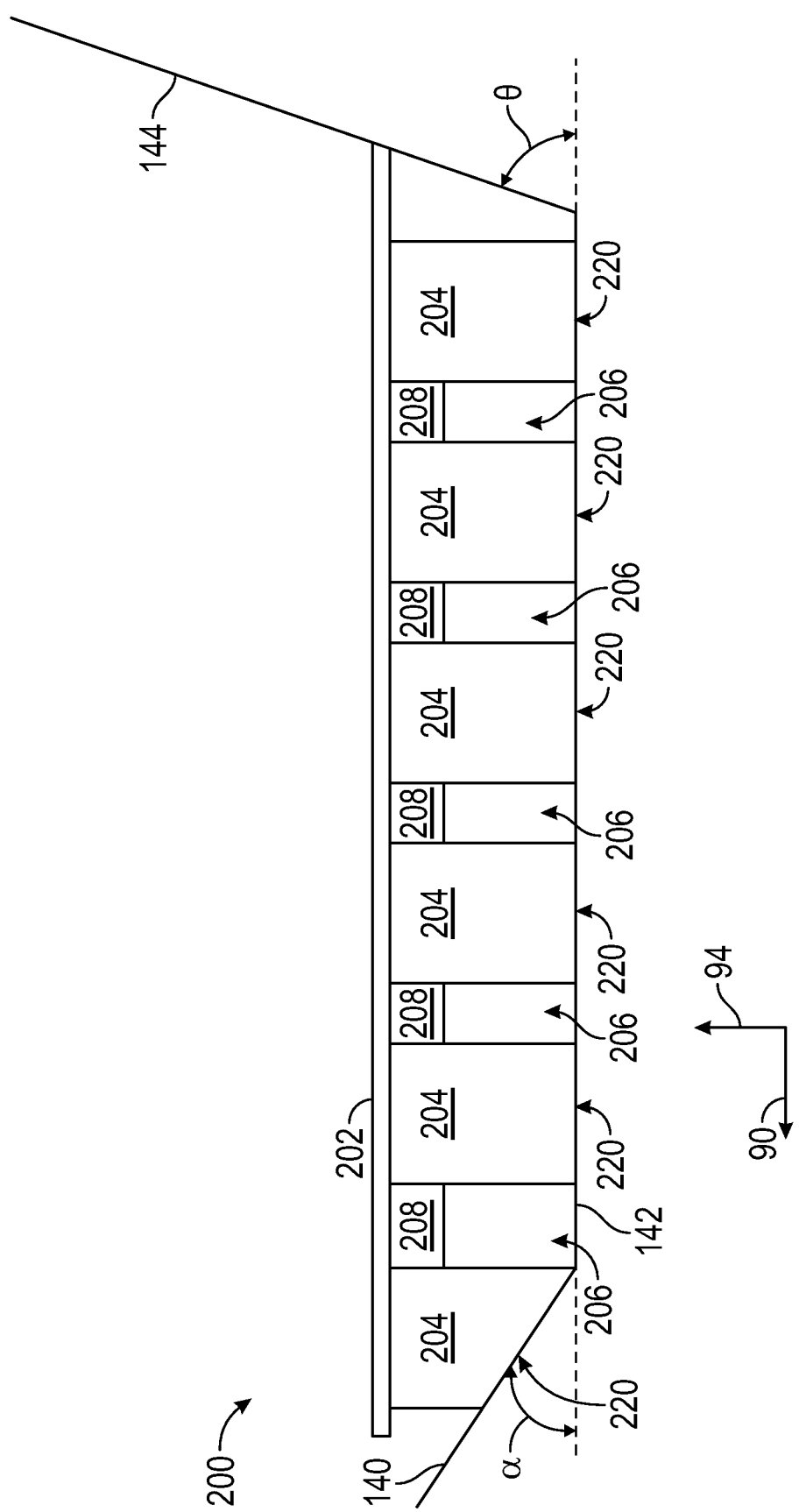
FIG. 4 is a side section view of a blast mat for use with the front cabin of FIG. 2, according to an exemplary embodiment.
Figure 5:
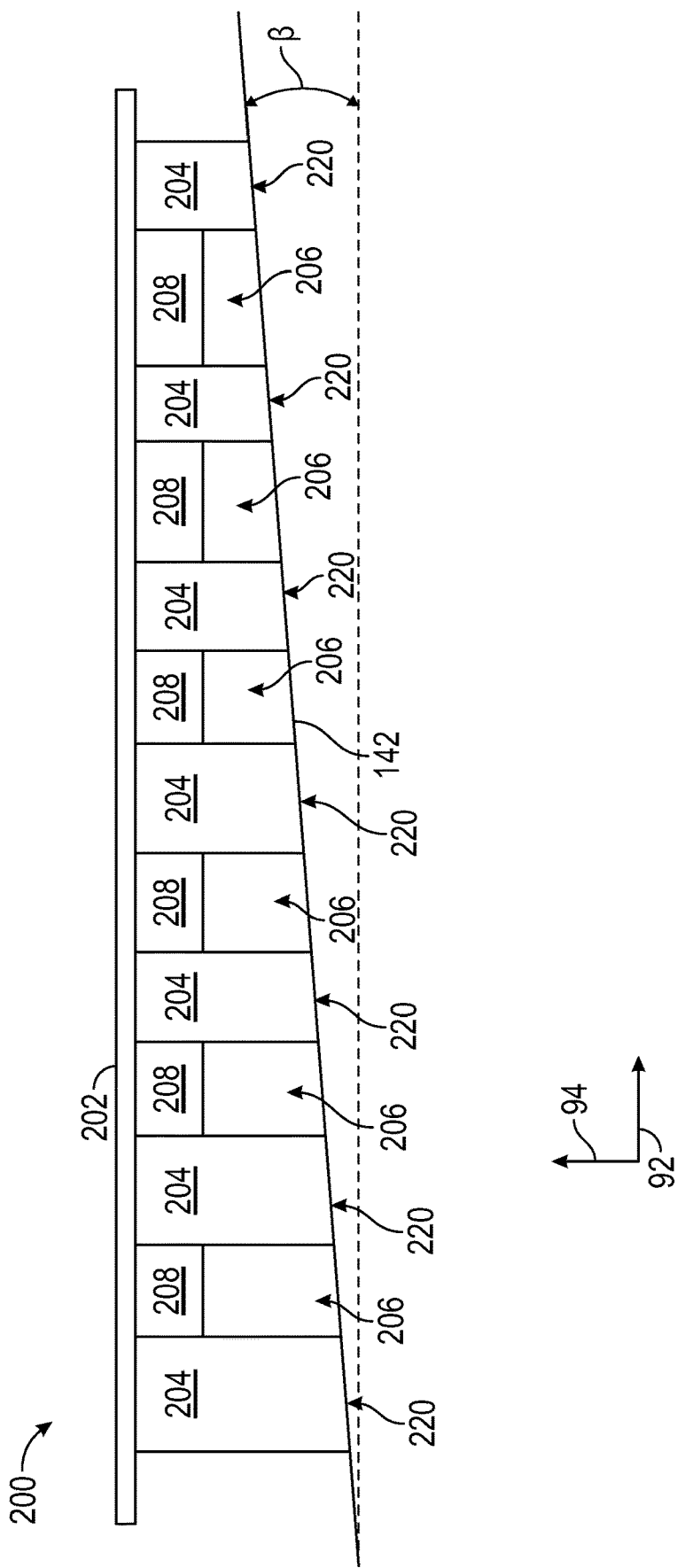
FIG. 5 is a front section view of the blast mat of FIG. 4.

Referring to FIGS. 2, 4, and 5, the side footwell 132 is defined in part by a front wall 140, a bottom wall 142, and a rear wall 144 of the front cabin 20. In other embodiments, the side footwell 132 is otherwise defined. The front wall 140, the bottom wall 142, and the rear wall 144 are planar, according to the exemplary embodiment shown in FIG. 2. The front wall 140 and the rear wall 144 intersect the bottom wall 142 at an angle $\alpha$ and at an angle $\theta$, respectively, when viewed from the side (e.g., in a plane parallel to the center plane 96, with respect to the longitudinal axis 90). The angle θ may be greater than the angle α. The front wall 140 extends vertically upward (e.g., inclines) toward the front of the vehicle 10. The rear wall 144 extends vertically upward (e.g., inclines) toward the rear of the vehicle 10. The bottom wall 142 may be parallel to the longitudinal axis 90. The bottom wall 142 is angled relative to the lateral axis 92 at an angle β such that the bottom wall 142 extends vertically downward (e.g., declines) as it extends towards the center plane 96. In some embodiments, the front wall 140 and/or the rear wall 144 are angled relative to the lateral axis 92.

According to the exemplary embodiment shown in FIG. 2, the front cabin 20 includes an energy absorbing device, shown as blast mat 200. The blast mat 200 is disposed within the side footwell 132, according to an exemplary embodiment. The blast mat 200 rests atop (e.g., engages) the front wall 140 and the bottom wall 142, according to an exemplary embodiment. The blast mat 200 is configured to at least partially support the feet and legs of the occupant located in the seat 102. The blast mat 200 is configured to absorb and dissipate energy from a blast event (e.g., an explosion originating underneath the front cabin 20, etc.). Without the blast mat 200, more energy from the blast event would travel upwards into the feet and legs of the occupant and impart a greater force on the feet and legs of the occupant. The blast mat 200 may be manufactured from an energy absorbing material (e.g., foam, rubber, etc.) and/or may be shaped (e.g., with a series of holes or cutouts) to facilitate the absorption and dissipation of blast energy.

Figure 6:
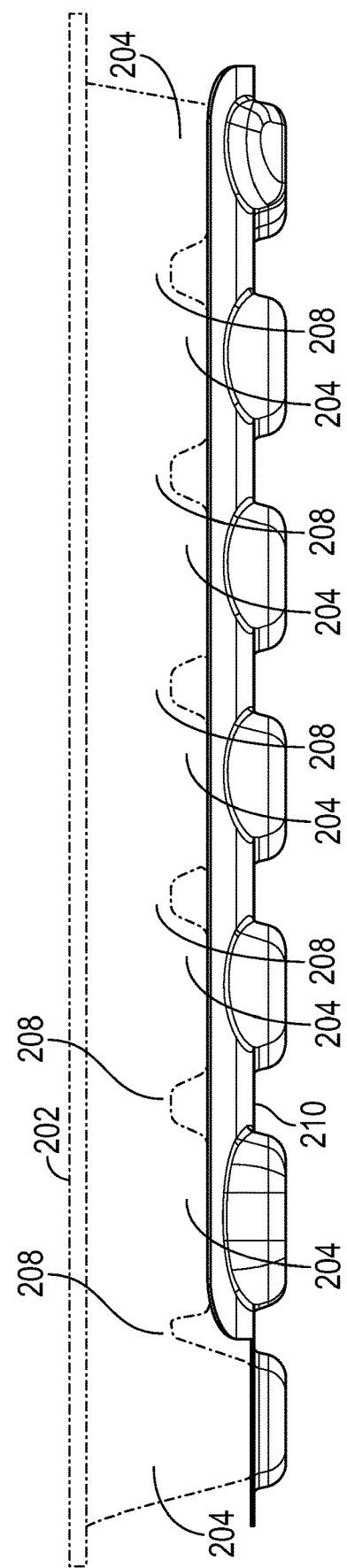
FIG. 6 is a side view of the blast mat of FIG. 4.

FIG. 4 shows a section view of the blast mat 200 along a plane parallel to the center plane 96. FIG. 4 is a left side view of the blast mat 200, according to an exemplary embodiment. FIG. 5 shows a section view of the blast mat 200 along a plane that is perpendicular to the center plane 96 and the longitudinal axis 90. FIG. 5 is a front side view of the blast mat 200, according to an exemplary embodiment. The blast mat 200 includes a planar member, shown as top pad 202, that is oriented parallel to a horizontal plane containing the longitudinal axis 90 and the lateral axis 92. In some embodiments, the top pad 202 is stiff (e.g., relative to the other materials used to construct other portions of the blast mat 200, etc.). In other embodiments, the top pad 202 is flexible. The top pad 202 defines a top surface of the blast mat 200 and is configured to contact the feet of the occupant seated in the seat 102. A number of projections 204 extend downward from the top pad 202. The projections 204 may extend parallel to the vertical axis 94 and define spaces 206 between the individual projections 204. In some embodiments, the projections 204 are arranged in a grid pattern (e.g., along lateral and longitudinal lines, etc.). As shown in FIGS. 4 and 5, the projections 204 have a rectangular cross section. In other embodiments, the projections 204 have other shapes (e.g., cylindrical, frustoconical, etc.). In some embodiments, the blast mat 200 includes webbing, shown as webbing 208, extending between the projections 204. The webbing 208 may be formed from the same or a similar material as the projections 204. As shown in FIGS. 4 and 5, the webbing 208 extends downward from the top pad 202 and between the projections 204. The webbing 208 may cover the entire bottom surface of the top pad 202 or may leave portions of the bottom surface of the top pad 202 exposed, according to various embodiments. According to the exemplary embodiment shown in FIG. 6, the blast mat 200 further includes a cover 210. In one embodiment, the cover 210 is coupled to the bottom of the projections 204. The cover 210 may span the bottom of the blast mat 200 laterally and longitudinally (e.g., entirely, other than ends of the projections 204, etc.).

Terminal ends of the projections 204 contact a bottom surface of the side footwell 132 (e.g., a support surface), which is defined by the top surfaces of the front wall 140, the bottom wall 142, and the rear wall 144. The portion of each projection 204 that contacts the bottom surface of the side footwell 132 is a bottom surface 220 of the projection. Together, the bottom surfaces 220 of the projections 204 define a bottom surface of the blast mat 200. In embodiments that include the cover 210, the bottom surfaces 220 may contact the cover 210, and the cover 210 may contact the bottom wall 142 and the front wall 140. In such embodiments, the portions of the cover 210 disposed below the bottom surfaces 220 that contact the bottom wall 142 and the front wall 140 define the bottom surface of the blast mat 200. The cover 210 may be configured to match the shape of the bottom surfaces 220 and may be relatively thin compared to the overall thickness of the blast mat 200.

The projections 204 are shaped such that the bottom surfaces 220 match (e.g., are a negative impression of, follow, correspond with, extend along, etc.) the longitudinal and lateral inclines and/or declines of the front wall 140 and the bottom wall 142. As shown in FIG. 4, the majority of the projections 204 terminate at the bottom wall 142 and are oriented parallel to the longitudinal axis 90 in an orientation that matches the bottom wall 142. As shown in FIG. 4, one row of projections 204 (e.g., the leftmost projection 204 shown in FIG. 4, etc.) terminates at the front wall 140. The bottom surfaces 220 of those projections 204 are angled relative to the longitudinal axis 90 (e.g., when viewed from the side) to match the contour of the front wall 140 (e.g., at angle α, etc.). As shown in FIG. 5, the bottom surfaces 220 of the projections 204 that terminate at the bottom wall 142 are angled relative to the lateral axis 92 (e.g., when viewed from the front, etc.) to match the contour of the bottom wall 142 (e.g., at angle β, etc.). In some embodiments, the front wall 140 is angled relative to the lateral axis 92 (e.g., when viewed from the front, etc.), and the bottom surfaces 220 of the projections 204 that terminate at the front wall 140 are angled relative to the lateral axis 92 to match the contour of the front wall 140. Accordingly, the bottom surfaces 220 may be angled relative to both the lateral axis 92 and the longitudinal axis 90 (e.g., when viewed from the side and the front, etc.). As shown, none of the projections 204 terminate at the rear wall 144. In other embodiments, however, one or more of the projections 204 terminate at the rear wall 144, and the bottom surfaces 220 of those projections are oriented to match the rear wall 144. In still other embodiments, the projections 204 are otherwise shaped based on the shape of the side footwell 132.

In addition to orienting the bottom surfaces 220 of the projections 204 such that they match the bottom surface of the side footwell 132, the thicknesses of the projections 204 are varied throughout the blast mat 200 such that the top pad 202 maintains a level orientation (e.g., parallel to a horizontal plane, etc.). The thickness of the blast mat 200 is defined as the distance between the top surface of the blast mat 200 and the portions of the bottom surfaces of the blast mat 200 that engage the support surface (e.g., the front wall 140, the bottom wall 142, the rear wall 144, etc.). The overall thickness of the blast mat 200 (i.e., the maximum distance between the bottom surface of the blast mat 200 and the top surface of the blast mat 200) is thicker than that of a conventional blast mat. The increased thickness of blast mat 200 facilitates maintaining the top pad 202 in a level orientation while still maintaining a desired thickness of the blast mat 200 for blast energy dissipation. By way of example, the thinnest portion of the blast mat 200 may correspond to a projection 204 above the front wall 140, as shown in FIG. 2. The thickness of this projection 204 is reduced to accommodate the angled surface of the front wall 140. However, the thickness of the blast mat 200 at the thinnest portion may still be thick enough to provide sufficient blast energy dissipation to prevent injury. The seat 102 is occupied by a driver of the vehicle 10 during operation of the vehicle. The blast mat 200 is configured such that it does not interfere with the operation of accelerator pedals or brake pedals used by the driver.

The thickness of the blast mat 200 may additionally or alternatively account for varying blast resistance throughout different portions of a human foot. By way of example, a front portion of the blast mat 200 (e.g., the projections 204 above the front wall 140) may support a front portion of a foot (e.g., the toes) of the occupant. The front portion of the foot may be more resistant to blast energy than a rear portion of the foot (e.g., the heel), which is supported by a rear portion of the blast mat 200 (e.g., projections 204 located rearward from the front wall 140). The rear portion of the blast mat 200 has a greater thickness than the front portion of the blast mat 200. The reduced thickness of the front portion of the blast mat 200 still provides sufficient blast energy dissipation, particularly because the front portion of the occupant's foot may be more resistant to blast energy than the rear portion of the portion of the foot.

The varying thicknesses of the projections 204 and the angled orientations of the bottom surfaces 220 facilitate maintaining the top of the blast mat 200 in a level orientation (i.e., parallel to a horizontal plane), taking into account the shape of the floor upon which the blast mat 200 rests. In certain embodiments, such as shown in FIG. 5, the blast mat 200 has different thickness at different lateral positions thereof when viewed from the front. The different thickness may facilitate accounting for lateral variations (e.g., a lateral slope, etc.) in the floor of the side footwell 132. Accounting for lateral variations in the floor of the side footwell 132 may facilitate maintaining a level orientation of the top surface. Maintaining a level orientation of the top surface of the blast mat 200 facilitates both of the occupant's feet resting on the blast mat 200 at the same height, which is optimally comfortable for the occupant.

In other embodiments, the projections 204 are contiguous such that the spaces 206 are omitted. In some such embodiments, the blast mat 200 is formed from one or more pieces of foam or other energy absorbing material that are formed, cut, or otherwise shaped to provide the desired orientations of the bottom surfaces 220. Accordingly, the bottom surface of the blast mat 200 may be formed by one continuous piece of material without any holes or spaces.

Figure 7:
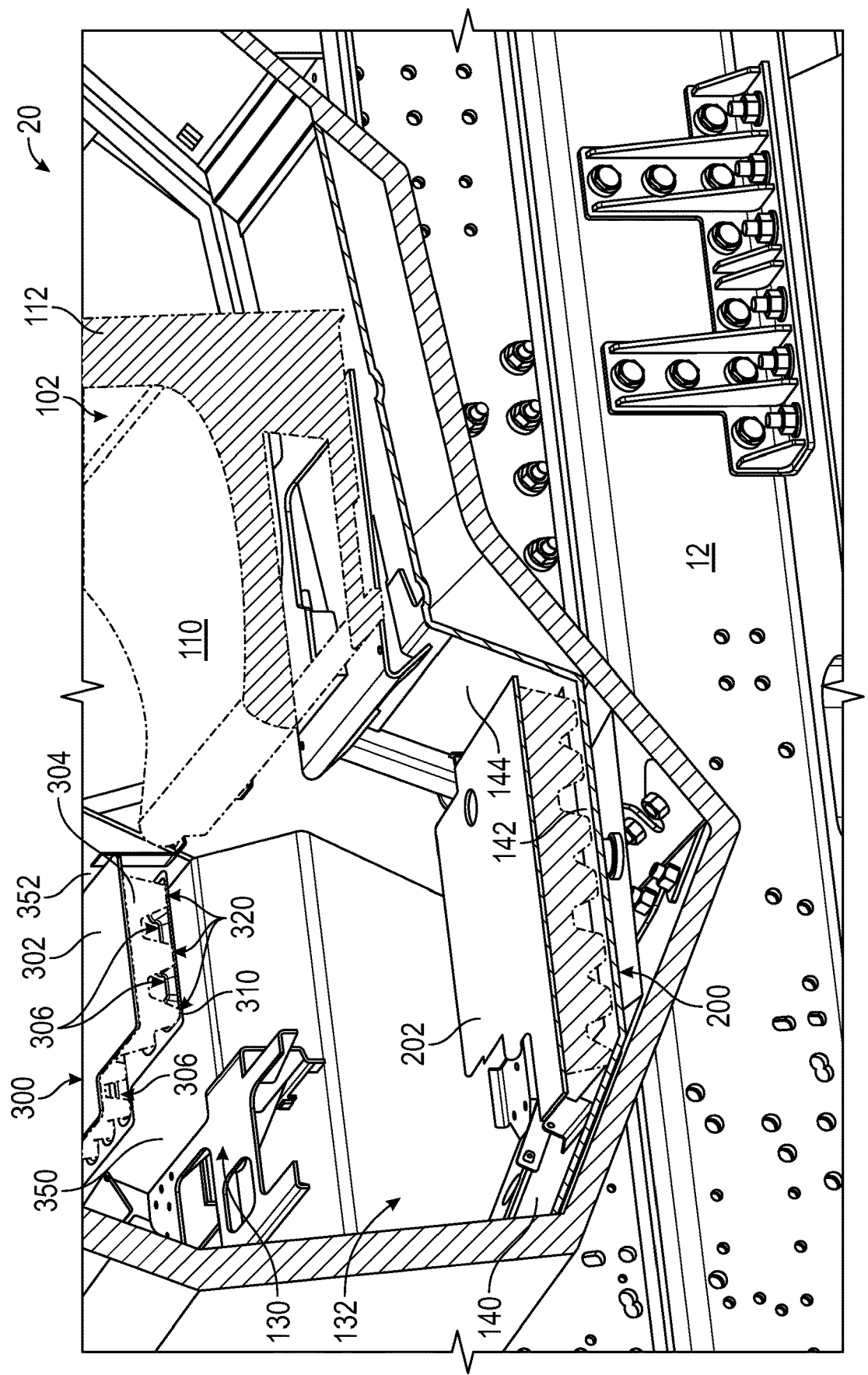
FIG. 7 is a perspective section view of the front cabin of FIG. 2.

Referring to FIGS. 2 and 7, the front cabin 20 includes a blast mat 300 located within the center footwell 130. The blast mat 300 is configured to support the feet and legs of an occupant seated in the seat 102. The blast mat 300 may be of a substantially similar construction to the blast mat 200, having a top pad 302, projections 304 defining spaces 306, and webbing 308. In some embodiments, the blast mat 300 further includes a cover 310. The cover 310 may be substantially similar to the cover 210. The projections 304 have bottom surfaces 320 shaped to match the bottom surface of the center footwell 130. The bottom surface of the center footwell 130 is defined by a bottom wall 350 and a rear wall 352. The bottom wall 350, at which all the projections 304 terminate, has a level orientation (i.e., an orientation parallel to a horizontal plane) such that the projections 304 each have the same thickness. The rear wall 352 is angled relative to the bottom wall 350. In other embodiments, the bottom wall 350 does not have a level orientation. The bottom wall 350 and the rear wall 352 are vertically offset upward from the bottom wall 142 and the rear wall 144 of the side footwell 132, respectively.

Figure 8:
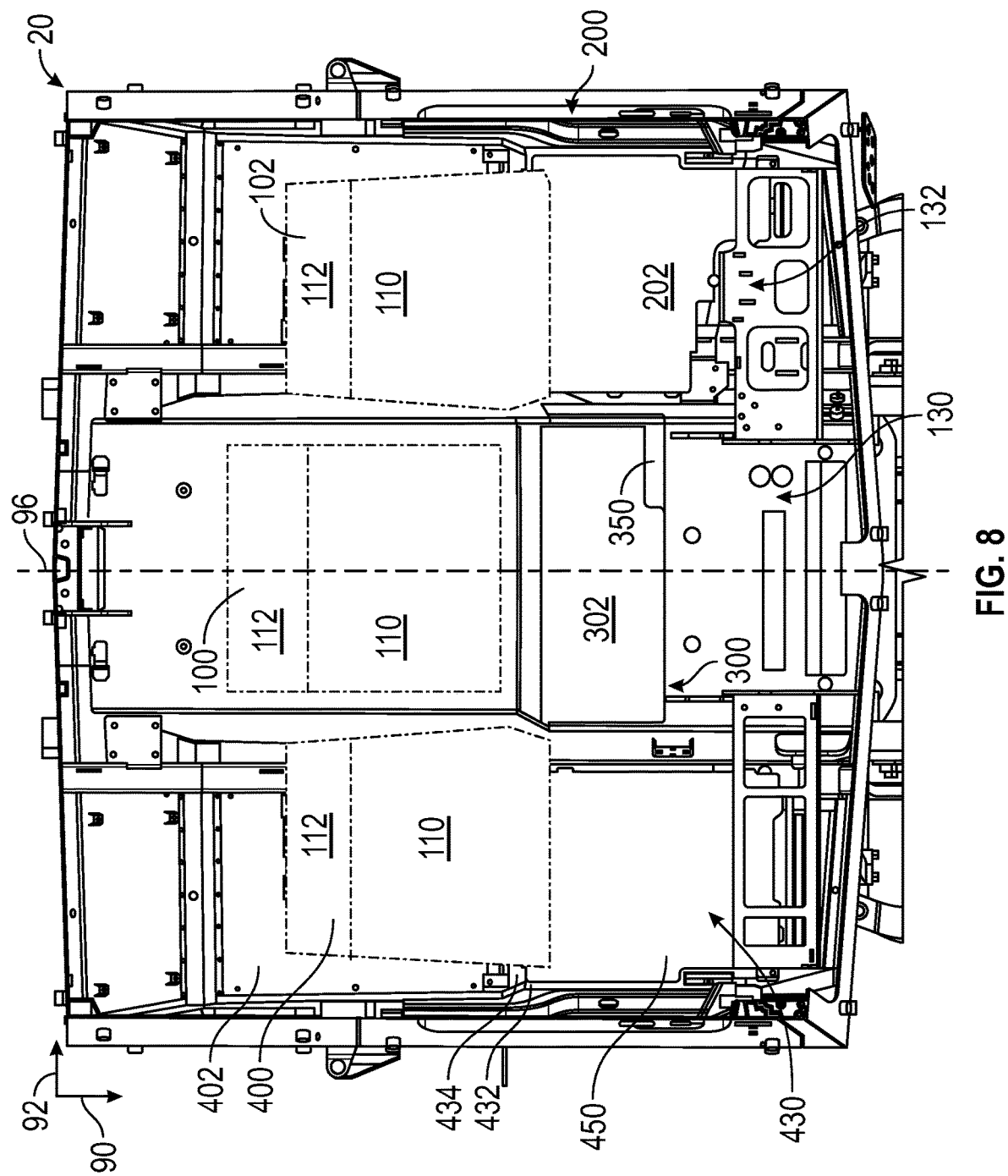
FIG. 8 is a top view of the interior of a front cabin of FIG. 2 including an additional seat, according to an exemplary embodiment.
Figure 9:
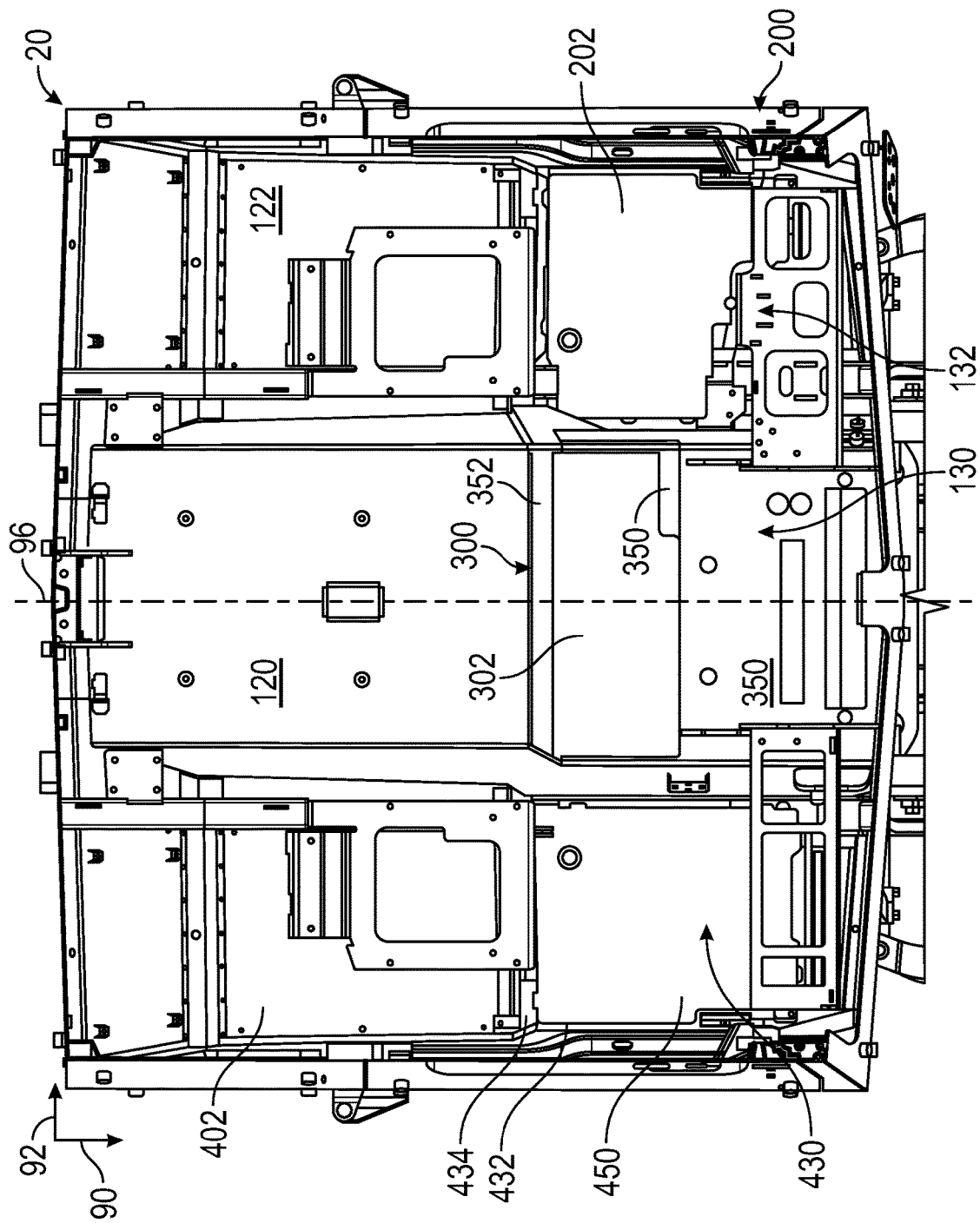
FIG. 9 is a top view of the interior of the front cabin of FIG. 2 with all of the seats removed.

Referring to FIGS. 8 and 9, the front cabin 20 further includes a seat 400 coupled to a floor section 402. A footwell 430 is defined in part by a bottom wall 432 and a rear wall 434 of the front cabin 20. The footwell 430 is configured to receive the feet and legs of an occupant seated in the seat 400. The seat 400, the floor section 402, and the footwell 430 are arranged symmetrically with the seat 102, the floor section 122, and the side footwell 132 across the center plane 96. The seat 400, the floor section 402, and the footwell 430 are substantially similar to the seat 102, the floor section 122, and the side footwell 132 except for being mirrored across the center plane 96. A blast mat 450 is positioned within the footwell 430. The blast mat 450 may be substantially similar in construction to the blast mat 200. The blast mat 450 may be differently shaped than the blast mat 200 to facilitate placement thereof around components within the footwell 430. By way of example, the blast mat 450 may have a bottom surface and/or projections that are shaped to correspond with the top surfaces of a front wall, the bottom wall 432, and the rear wall 434 of the footwell 430 such that a top surface of the blast mat 450 is oriented parallel to a horizontal plane.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A vehicle comprising:
    a frame;
    a plurality of tractive assemblies engaging the frame;
    a cabin coupled to the frame, the cabin comprising:
        a seat configured to support an occupant; and
        a plurality of walls at least partially defining a footwell configured to receive a foot of the occupant when the occupant is seated in the seat; and
        a blast mat positioned within the footwell and configured to absorb energy from an explosion, thereby reducing energy transferred into the foot of the occupant due to the explosion, the blast mat having a top surface and a bottom surface;
    wherein the cabin defines:
        a longitudinal axis extending parallel to a forward direction of travel of the vehicle; and
        a lateral axis extending perpendicular to the longitudinal axis; and
    wherein at least a portion of the bottom surface of the blast mat engages at least one of the walls, and wherein a thickness of the blast mat is defined between the top surface and the portions of the bottom surface engaging at least one of the walls; and
    wherein the blast mat is positioned such that a first portion of the blast mat supports a first portion of the foot of the occupant and a second portion of the blast mat supports a second portion of the foot of the occupant, wherein the first portion of the foot of the occupant is more resistant to blast energy than the second portion of the foot of the occupant, and wherein the second portion of the blast mat has a greater thickness than the first portion of the blast mat.

2. The vehicle of claim 1, wherein the thickness of the blast mat is configured such that at least a portion of that the top surface is oriented parallel to a horizontal plane.

3. The vehicle of claim 2, wherein the plurality of walls includes a bottom wall and a front wall, wherein the front wall is angled relative to the bottom wall, wherein the bottom surface of the blast mat engages both the bottom wall and the front wall.

4. The vehicle of claim 3, wherein the cabin further defines a center plane extending perpendicular to the lateral axis and that is laterally centered within the cabin, wherein the bottom wall of the cabin declines as the bottom wall extends toward the center plane, and wherein the thickness of the blast mat increases as the blast mat extends toward the center plane.

5. The vehicle of claim 4, wherein the front wall of the cabin inclines as the front wall extends toward the front of the vehicle, and wherein the thickness of the blast mat decreases as the blast mat extends toward the front of the vehicle.

6. The vehicle of claim 1, further comprising a second blast mat having a top surface and a bottom surface;
    wherein the seat is a first seat, the footwell is a first footwell, the occupant is a first occupant, the walls are first walls, and the blast mat is a first blast mat, wherein the cabin further defines a center plane extending perpendicular to the lateral axis and that is laterally centered within the cabin, and wherein the first seat and the first footwell are laterally offset from the center plane;
    wherein the cabin further comprises:
        a second seat positioned along the center plane and configured to support a second occupant; and
        a second wall at least partially defining a second footwell configured to receive a foot of the second occupant when the second occupant is seated in the second seat;
    wherein at least a portion of the bottom surface of the second blast mat engages the second wall, and wherein the bottom surface of the second blast mat is positioned above the top surface of the first blast mat.

7. The vehicle of claim 6, further comprising a third blast mat having a top surface and a bottom surface;
    wherein the cabin further comprises:
        a third seat configured to support a third occupant; and
        a plurality of third walls at least partially defining a third footwell configured to receive a foot of the third occupant when the third occupant is seated in the third seat;
    wherein the third seat and the third footwell are laterally offset from the first seat and the first footwell, wherein at least a portion of the bottom surface of the third blast mat engages at least one of the third walls, wherein a thickness of the third blast mat is defined between the top surface of the third blast mat and the portions of the bottom surface of the third blast mat engaging at least one of the third walls, wherein the thickness of the third blast mat varies throughout the third blast mat, and wherein the bottom surface of the second blast mat is positioned above the top surface of the third blast mat.

8. A vehicle comprising:
    a frame;
    a plurality of tractive assemblies engaging the frame;
    a cabin coupled to the frame, the cabin comprising:
        a seat configured to support an occupant; and a bottom wall at least partially defining a footwell configured to receive a foot of the occupant when the occupant is seated in the seat; and a blast mat positioned within the footwell and configured to absorb energy from an explosion originating below the cabin, thereby reducing a force imparted on the foot of the occupant due to the explosion, the blast mat having a top surface and a bottom surface;

wherein the cabin defines:

a longitudinal axis extending parallel to a forward direction of travel of the vehicle; and a lateral axis extending perpendicular to the longitudinal axis;

wherein at least a portion of the bottom surface of the blast mat extends along the bottom wall of the cabin, wherein the top surface of the blast mat is planar, and wherein the bottom surface of the blast mat is angled relative to the top surface of the blast mat such that the top surface is angled relative to the bottom wall; and wherein a thickness of the blast mat is defined between the top surface and the portions of the bottom surface that extend across the bottom wall, wherein the blast mat is positioned such that a first portion of the blast mat supports a first portion the foot of the occupant and a second portion of the blast mat supports a second portion of the foot of the occupant, wherein the first portion of the foot of the occupant is more resistant to blast energy than the second portion of the foot of the occupant, and wherein the second portion of the blast mat has a greater thickness than the first portion of the blast mat.

9. The vehicle of claim 8, wherein the bottom wall is angled relative to a horizontal plane and wherein the bottom surface of the blast mat is angled relative to the top surface of the blast mat such that the top surface is oriented parallel to the horizontal plane.

10. The vehicle of claim 9, wherein the cabin further comprises a front wall that partially defines the footwell, wherein the front wall is angled relative to the bottom wall and the horizontal plane, wherein the bottom surface of the blast mat is a first bottom surface, wherein the blast mat further includes a second bottom surface, and wherein at least a portion of the second bottom surface extends along the front wall of the cabin.

11. The vehicle of claim 10, wherein the front wall of the cabin is angled relative to the longitudinal axis such that the front wall inclines toward a front end of the vehicle.

12. The vehicle of claim 11, wherein the cabin further defines a center plane extending perpendicular to the lateral axis and that is laterally centered within the cabin, wherein the bottom wall of the cabin is angled relative to the lateral axis such that the bottom wall declines as the bottom wall extends toward the center plane.

13. The vehicle of claim 8, further comprising a second blast mat having a top surface and a bottom surface;

wherein the seat is a first seat, the footwell is a first footwell, the occupant is a first occupant, the bottom wall is a first bottom wall, and the blast mat is a first blast mat, wherein the cabin further defines a center plane laterally centered within the cabin and extending perpendicular to the lateral axis, and wherein the first seat and the first footwell are laterally offset from the center plane;

wherein the cabin further comprises:

a second seat configured to support a second occupant; and a second bottom wall at least partially defining a second footwell configured to receive a foot of the second occupant when the second occupant is seated in the second seat;

wherein the second seat and the second wall are laterally offset from the center plane, wherein at least a portion of the bottom surface of the second blast mat extends along the second bottom wall, wherein the top surface of the second blast mat is planar, wherein the second bottom wall is angled relative to a horizontal plane, and wherein the bottom surface of the second blast mat is angled relative to the top surface of the second blast mat such that the top surface of the second blast mat is oriented parallel to the horizontal plane.

14. The vehicle of claim 13, further comprising a third blast mat having a top surface and a bottom surface;

wherein the cabin further comprises:

a third seat positioned along the center plane and configured to support a third occupant; and a third bottom wall at least partially defining a third footwell configured to receive a foot of the third occupant when the third occupant is seated in the third seat;

wherein the third bottom wall is positioned above the first bottom wall and the second bottom wall, wherein at least a portion of the bottom surface of the third blast mat extends along the third bottom wall, wherein the top surface of the third blast mat is planar, and wherein the bottom surface and the top surface of the third blast mat are oriented substantially parallel to the horizontal plane.

15. A blast mat having a top surface and a bottom surface, wherein at least a portion of the bottom surface is configured to engage a support surface at least partially defining a footwell of a vehicle, wherein the top surface is configured to support a foot of an occupant of the vehicle, wherein the blast mat is configured to absorb energy from an explosion originating below the blast mat, thereby reducing a force imparted on the foot of the occupant by the explosion, and wherein a thickness of the blast mat is defined between the top surface and the portion of the bottom surface configured to engage the support surface; and wherein the blast mat is configured to be positioned within the footwell such that a first portion of the blast mat supports a first portion of the foot of the occupant and a second portion of the blast mat supports a second portion of the foot of the occupant, wherein the first portion of the foot of the occupant is more resistant to blast energy than the second portion of the foot of the occupant, and wherein the second portion of the blast mat has a greater thickness than the first portion of the blast mat.

16. The blast mat of claim 15, wherein the top surface is planar, wherein the support surface is angled relative to a horizontal plane, and wherein the thickness of the blast mat is configured such that the top surface is oriented substantially parallel to the horizontal plane when the bottom surface of the blast mat engages the support surface.

17. The blast mat of claim 16, wherein the support surface is a first support surface, wherein the bottom surface of the blast mat is configured to engage a second support surface that partially defines the footwell, and wherein the second support surface is angled relative to the first support surface.

* * * * *